Figure 9:
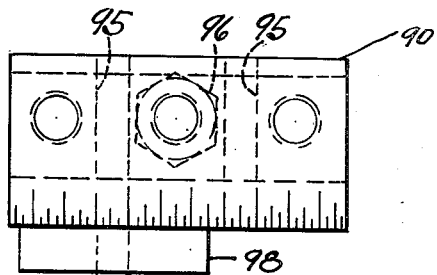

July 10, 1951  T. McDOWELL  2,559,982
ATTACHMENT FOR CUTTING TABLES
Filed Dec. 13, 1946  6 Sheets-Sheet 1
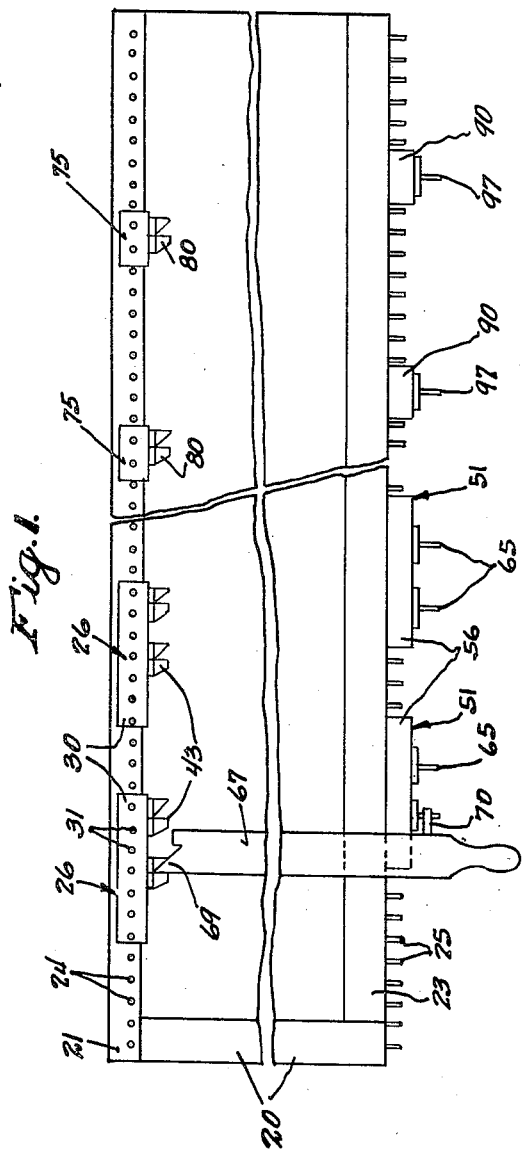
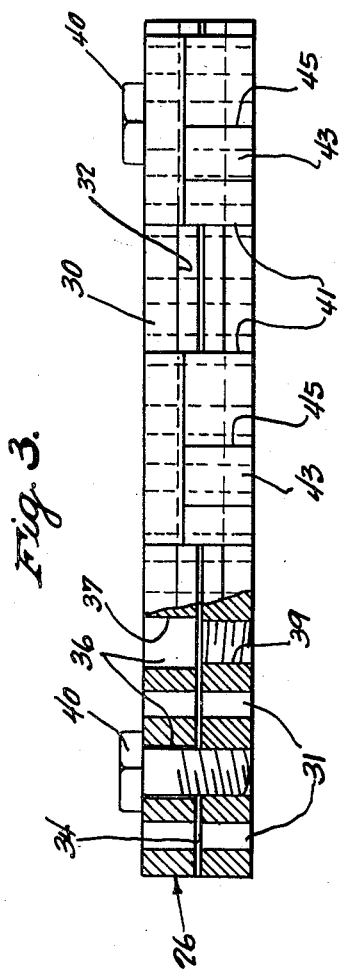
INVENTOR.
THOMAS McDOWELL
BY Olen E. Bee
ATTORNEY.

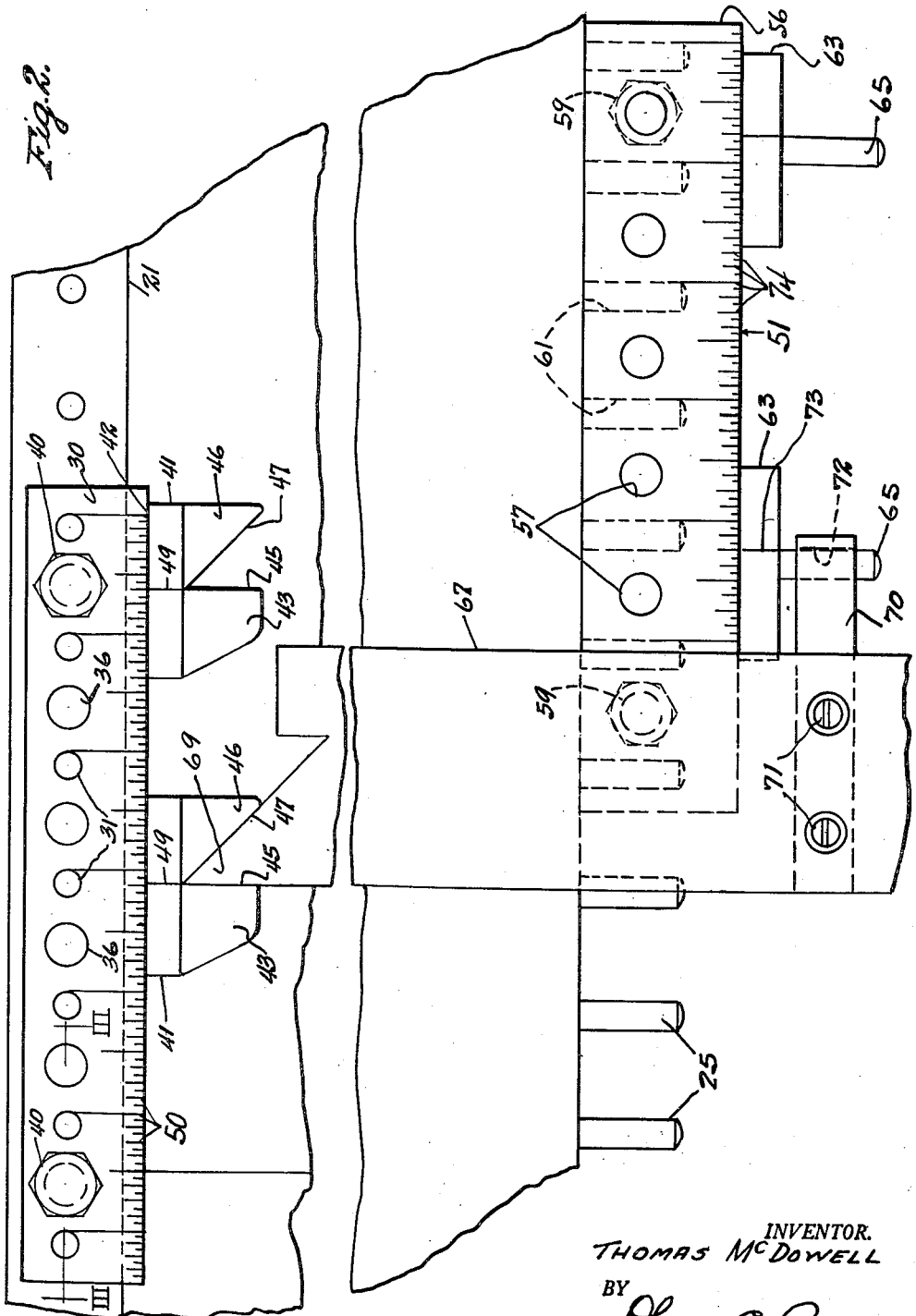

July 10, 1951 T. McDOWELL 2,559,982
ATTACHMENT FOR CUTTING TABLES
Filed Dec. 13, 1946 6 Sheets-Sheet 3
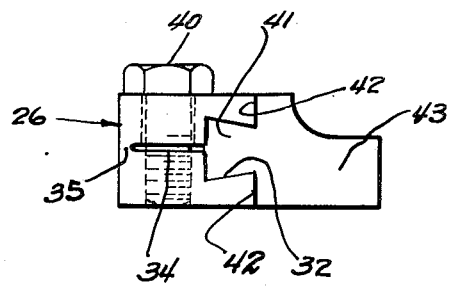
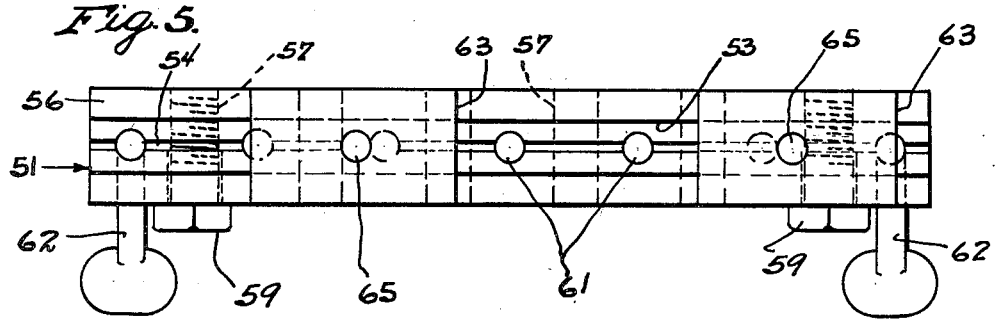
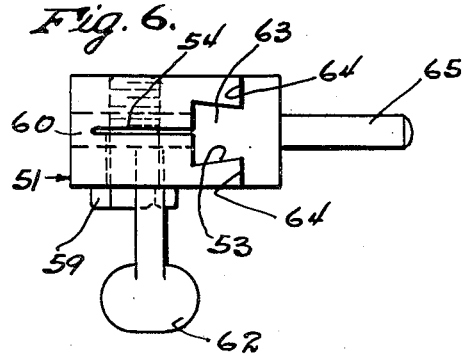
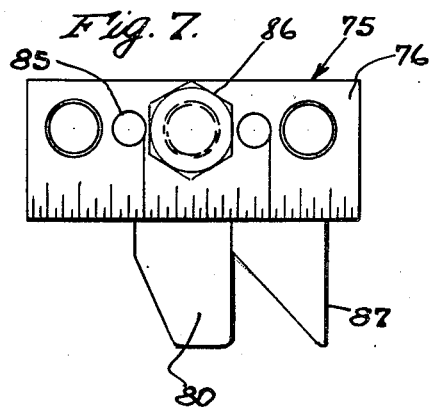
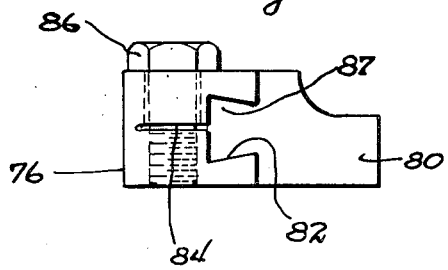
INVENTOR.
THOMAS McDOWELL
BY Olen E Bee
ATTORNEY.

INVENTOR.
THOMAS McDOWELL
BY Olen E Bee
ATTORNEY.

July 10, 1951 T. McDOWELL 2,559,982
ATTACHMENT FOR CUTTING TABLES
Filed Dec. 13, 1946 6 Sheets-Sheet 5

INVENTOR.
THOMAS McDOWELL
BY Olen E. Bee
ATTORNEY.

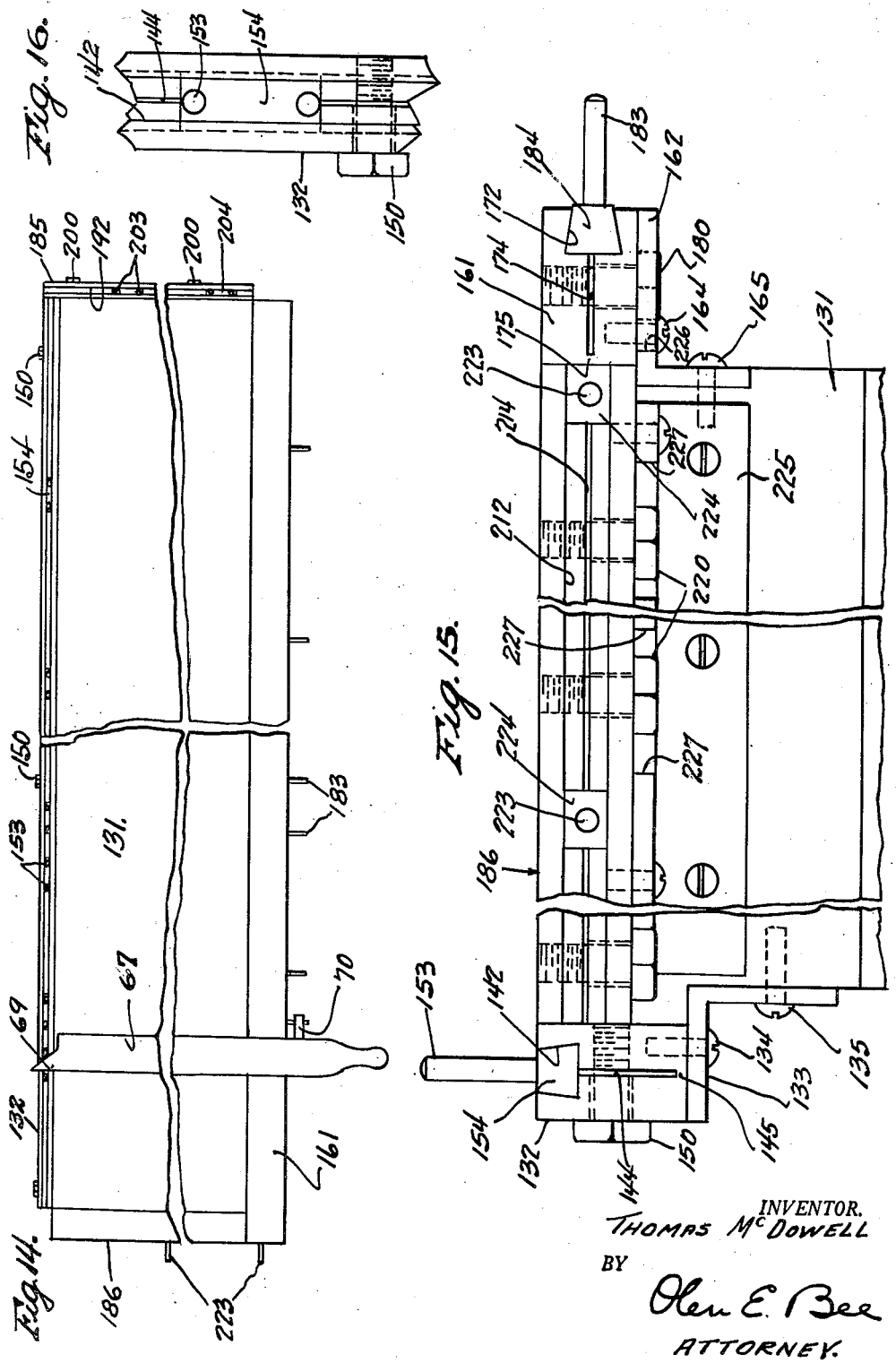

Patented July 10, 1951

2,559,982

UNITED STATES PATENT OFFICE 2,559,982

ATTACHMENT FOR CUTTING TABLES

Thomas McDowell, Mount Vernon, Ohio, assignor to Pittsburgh Plate Glass Company, Allegheny County, Pa., a corporation of Pennsylvania Application December 13, 1946, Serial No. 715,958

12 Claims. (Cl. 33—80)

This invention relates to the manual cutting of sheet glass and it has particular relation to cutting tables adapted to facilitate the cutting of glass sheets to dimensions involving fractional measurements, as well as conventional unit measurements.

One object of the invention is to provide an improved cutting table upon which an operator can make adjustments for cutting glass to widths and lengths measured in inches and/or fractions of inches, or other units of measurements in conjunction with the use of a straightedge type of cutting rule.

Another object of the invention is to provide an improved arrangement and mounting for so-called gauging projections employed in setting a straightedge rule in manually cutting sheet glass on tables.

Another object of the invention is to provide an improved set or sets of attachments detachably mountable upon standard cutting tables and adapted to be adjusted for fractional cutting of glass sheets without materially changing the conventional operations practiced in using conventional straightedge cutting rules.

Another object of the invention is to provide an improved gauging attachment adjustable upon conventional glass cutting tables for simplifying the cutting of sheet glass into various dimensions including fractional dimensions.

Figure 10:
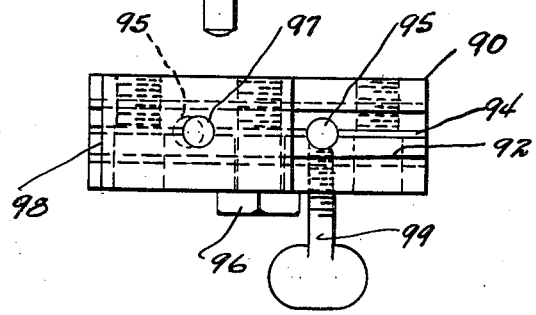
Figure 12:
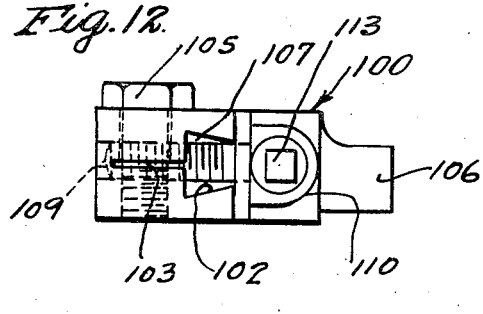
Figure 13:
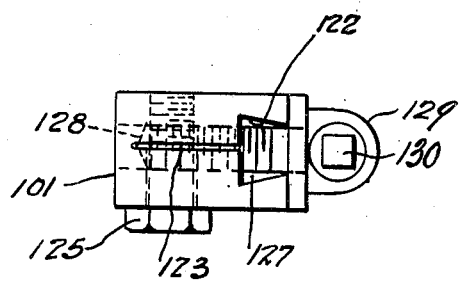

In the drawing:

Figure 1 is a fragmentary diagrammatic plan of a cutting table with fractional adjusting devices mounted thereon; Figure 2 is a fragmentary plan, on a larger scale, showing in detail the mounting of fractional cutting devices upon a table; Figure 3 is a fragmentary view, partially in vertical section and partially in front elevation, the section being taken substantially along the line III—III of Figure 2; Figure 4 is an end elevation of the structure shown in Figure 3; Figure 5 is a front elevation of the device shown in the lower portion of Figure 2; Figure 6 is an end elevation of the device shown in Figure 5; Figure 7 is a plan of an auxiliary device similar to that shown in Figure 3 for attachment to the upper rear portion of a cutting table; Figure 8 is an end elevation of the device shown in Figure 7; Figure 9 is a plan of an auxiliary device similar to that shown in Figure 5 for attachment to the lower or front portion of a cutting table; Figure 10 is a front elevation of the structure shown in Figure 9; Figure 11 is a fragmentary plan similar to Figure 2 and in which other forms of devices are shown; Figure 12 is an end elevation of the one of the devices at the upper rear portion of the cutting table shown in Figure 11; Figure 13 is an end elevation of one of the devices at the lower or front edge of the cutting table; Figure 14 is a fragmentary diagrammatic plan of another form of cutting table with fractional adjusting devices mounted thereon; Figure 15 is a fragmentary end elevation, on a larger scale, of the structure shown in Figure 14; and Figure 16 is a fragmentary plan of an upper or rear portion of the cutting table.

In practicing the invention there is provided a platform or table 20 having an upper or rear marginal rail 21 rigidly mounted thereon. A lower rail 23 is rigidly mounted along the lower marginal portion of the table. The upper rail is formed with a row of upwardly disposed rule-gauging projections 24 spaced uniformly according to unit measurements, for example, according to one inch units or one centimeter units. A second row of horizontally disposed rule-gauging projections 25 formed on the lower rail 23 is parallel to the upper row of projections 24, but the respective individual pins of the two rows are disposed at right angles to one another. This arrangement and structure of the table is more or less standard.

Upper fractional adapters 26, which can be referred to as tip plugs, are disposed demountably upon the row of projections 24. Each adapter (Figures 2 to 4) comprises a bar 30 formed with a row of parallel openings 31 which are spaced uniformly according to the spacing of the projections 24 and are sufficiently large to receive a plurality of these projections in snugly fitting relation. The length of each projection 24 is slightly less than the length or depth of the openings 31.

One side of each adapter is formed with an undercut or dovetail groove 32 and from the bottom of this groove the bar is cut to form a slit 34 extending to a line adjacent the side of the bar opposite the mouth of the groove 32 so as to leave a relatively narrow resilient neck 35. The bar is composed of resilient metal and the groove 32 can be constricted slightly by drawing the walls thereof toward each other, thereby springing the neck 35. It is to be noted that the projection receiving openings 31 traverse the slit 34.

A row of openings 36 disposed between adjacent projection receiving openings 31 are formed with upper smooth bore sections 37 and lower tapped sections 39 of slightly less diameter than the smooth bore sections for receiving bolts 40 which can be threaded into the tapped sections. One of these bolts can be threaded into any of the sections 39 and tightened to draw the walls of the bar toward each other for the purpose of constricting the groove 32.

Dovetail blocks 41 (Fig. 4) are freely slidable in the groove 32 of each bar until the bolts 40 are tightened to draw the walls of the groove tightly against the blocks and thereby to anchor them rigidly. Each block 41 is formed with shoulders 42 which ride upon the outer side of the bar adjacent the groove. Each block (Fig. 2) is also formed with an integral rule-gauging projection 43 that has a vertical flat face 45 disposed at right angles to the row of projection receiving openings 31. The block 41 is also formed with a bias cut projection 46 that has a vertical face 47 disposed at an angle of approximately 45° to the face 45. An index mark 49 aligned with the vertical face 45 on each block is alignable with any of the graduations 50 defining a scale that is impressed upon the upper side of the bar 30.

At the front or lower edge of the table 20 front adapters 51 (Figs. 5 and 6), which can be referred to as hook plugs, are constructed similarly to the rear adapters 26. Each of these front adapters has a dovetail groove 53 and a slit 54 running longitudinally of a bar 56 which constitutes the body of the adapter. Openings 57 traverse the slit to receive bolts 59 in the same manner as the bolts 40 are received in the rear adapter 26, and a resilient neck 60 defined by the slit 54 can be sprung by tightening the bolts. The projection receiving openings 61 formed in each bar 56 are spaced according to the spacing of the front projections 25 which fit snugly therein. These projection receiving openings are bored substantially in the plane of the slit 54 and in parallel relation according to the arrangement of the front projections 25, as clearly indicated in Figure 5.

Thumb screws 62 are screw threaded transversely in each end portion of the bar 56 so as to engage in locking relation against the projections 25 and at right angles thereto. These thumb screws are thus locked upon two of the pins 25 at the end portions of each bar 56 and prevent accidental displacement of the bar from the pins 25.

Dovetail blocks 63 fit into the dovetail grooves 53 for free movement longitudinally thereof until the bolts 59 are tightened to anchor them rigidly. Shoulders 64 are formed on the blocks to ride upon the front side of the grooved bar as the blocks slide in the grooves. Each block 63 is formed with a rule-engaging projection 65 which cooperates with a rule 67 and with the upper rule-engaging projections 43 in properly positioning the rule upon the table for a cutting operation. A bias cut upper portion 69 of the rule constituting a tip at its far end fits against the faces 45 and 47 of the block 41 and the lower or rear portion of the rule has an angular plate 70 rigidly secured thereon, as indicated at 71. This plate constitutes a hook adjacent the handle end of the rule and includes a downwardly disposed finger 72 that is adapted to fit against any of the projections 65. A mark 73 on each block 63 is aligned with the right hand side of the projection 65 thereon and is alignable with any of the graduations 74 defining a scale that is impressed upon the upper side of the bar 56.

In cutting glass sheets to certain predetermined dimensions an operator may require auxiliary rear adapters 75 which are formed with shorter bars 76 (Figs. 7 and 8) and are provided with only one rule engaging projection 80 corresponding to the projection 43. These auxiliary adapters are formed with dovetail grooves 82, slits 84, rows of openings 85, bolts 86, and rule gauging blocks 87 which correspond to the grooves 32, slits 34, rows of openings 31, bolts 40 and blocks 41, respectively, and function in substantially the same manner.

Likewise, auxiliary front adapters 90 are formed with dovetail grooves 92, slits 94, rows of openings 95, bolts 96, rule gauging projections 97, and blocks 98, which correspond substantially to the grooves 53, slits 54, rows of openings 61, bolts 59, rule gauging projection 65, and blocks 63, respectively and function in substantially the same manner. Thumb screws 99 are also threaded into the adapters in alignment with one of the openings 95 to lock the adapters upon the projections 25.

Referring to Figs. 11 to 13 the same table 20 to which the other adapters are applied is adapted to receive additional forms of rear and front adapters 100 and 101 which can be substituted for the adapters 26 and 51, respectively. The rear adapter 100 includes a dovetail groove 102, a slit 103, a row of openings 104, bolts 105, a gauging projection 106, and a block 107, which correspond to the dovetail groove 32, slit 34, openings 31, bolts 40, gauging projection 43, and blocks 41, respectively, and function in substantially the same manner. In this construction a bolt 109 having a bearing head 110 is threaded, as indicated at 112, into the rear adapter structure at one end portion thereof and in a horizontal direction at right angles to the groove 102. A threaded horizontal rod 113 has one of its ends rotatably mounted in the hollow bearing head 110 and is provided with a shoulder 114 which prevents the rod from being displaced in one direction in the bearing head. A lock nut 115 on the rod and disposed on the other side of the bearing head completes the mounting of the rod which is thus rotatable but cannot slide axially in this head. The end portion of the rod opposite the bolt 109 is threaded, as indicated at 116, through the block 107, and by applying a tool to the rod it can be turned to move the block longitudinally in the dovetail groove so as to position it at any desired location along the adapter.

The front adapter 101 (Fig. 13) includes a dovetail groove 122, a slit 123, openings 124, bolts 125, a gauging projection 126, and a block 127 which correspond to the dovetail groove 53, slit 54, openings 61, bolts 59, gauging projection 65 and block 63, respectively, and function in substantially the same manner. The front adapter 101 is provided with a bolt 128 that is formed with a bearing head 129 and is connected to an adjusting rod 130 that is screw threaded in the block 127 all mounted for operation in the same manner as the bolt 109, adjusting rod 113 and block 107, respectively, of the adapter 100 and therefore does not require further description.

In the form of the invention shown in Figs. 14 to 16 a cutting table 131 has a rear adapter 132 which extends along the rear marginal portion of the table and is rigidly secured to an angle plate 133 by means of fasteners 134. This plate is likewise rigidly secured to the body of the table by means of conventional fasteners 135. The adapter 132 is constructed similarly to the adapter 26 except that it is longer and includes a dovetail groove 142, a slit 144, a resilient neck 145, bolts 150, gauging projections 153 and blocks 154 which correspond substantially to the dovetail groove 32, slit 34, resilient neck 35, bolts 40, gauging projections 43, blocks 41, respectively, shown in Figures 1, 2 and 3.

In Figs. 14 to 16 the gauging projections extend integrally in an upward direction on each block 154 and each block is formed with two of these projections which are suitably spaced so as to receive the bias cut end of the rule 67 in substantially the same manner as the projections 43 receive it.

A front adapter 161 extends along the front marginal portion of the table and is rigidly secured to an angle plate 162 by means of fasteners 164. This angle plate is likewise rigidly secured to the body of the table by means of conventional fasteners 165. The adapter 161 is constructed similarly to the adapter 51 except that it is longer and it includes a dovetail groove 172, a slit 174, a resilient neck 175, bolts 180, rule gauging projections 183, and blocks 184 which correspond to the dovetail groove 53, slit 54, resilient neck 60, bolts 59, gauging projections 65, and blocks 63, respectively as shown in Figs. 1, 2 and 3.

If desired the right and left end marginal portions of the table (Fig. 14) can be provided with adapters 185 and 186 which correspond to the rear and front adapters 132 and 161, respectively. The right hand adapter 185 includes a dovetail groove 192, bolts 200, projections 203, and blocks 204 which are identical in function and arrangement to the groove 142, projections 153, and blocks 154 previously described with reference to the adapter 132. Likewise, the left hand adapter 186 includes a dovetail groove 212, a slit 214, bolts 220, projections 223, blocks 224, and supporting angle plate 225, which are identical in function and arrangement to the groove 172, slit 174, bolts 180, gauging projections 183, blocks 184, and angle plate 162 previously described and therefore these elements require no further description for complete understanding of their structure and function. As shown in Fig. 15 the angle plates 162 and 225 are notched as indicated at 226 and 227, respectively, to facilitate access to the bolts 180 and 220 in adjusting them.

From the foregoing description it will be apparent that various gauging projections shown in the drawing can be adjusted to position the rule at selective locations where it serves to guide the cutter in scoring the sheets according to the lengths and widths and determined by various fractional measurements.

In connection with one of the methods of manually cutting glass upon tables the glass sheet is gauged or squared at one side of the table for the first lines of cutting and then the glass is turned through an angle of 90° in the plane of the table top for the second series of lines of cutting. By employing the adapters described above a great variety of rectangular forms can be cut. However, in the event it is desired to cut glass to a rectangular form with only a small fractional difference between its length and width, for example, sizes 20¾ inches in length by 20½ inches in width, difficulties may arise because of the space required in the mounting of the blocks that carry the gauging projections. Likewise, in cutting glass to certain measurements the practice of the operator is to make successively several so-called stripping cuts along parallel lines before turning the glass.

After the stripping cuts are made and the glass has been turned through an angle of 90° as indicated above for the second series of cuts which are called paning cuts, certain of the latter may occur so close to one or more locations of the stripping cuts that the gauging projections cannot be set to conform to both sets of cuts without further adjustment. These odd sizes are somewhat rare but they are described to explain certain difficulties which arise occasionally in cutting glass. In order to avoid such unusual conflicts in the location of the lines of the cutting, the additional adapters 185 and 186 are mounted upon the right and left hand sides of the table (Fig. 14). Since these additional adapters are provided with gauging projections 203 and 223 which correspond to the projections 153 and 183, respectively, and are mounted for operation in the same manner, the cutting of odd sizes of glass which might otherwise result in conflict as to the placing of the projections is greatly simplified. The straight edge rule is applied to the glass at 90° to the first stripping lines of cutting. That is, after properly setting the gauging projections, the straight edge rule is applied across the table from the left to the right sides thereof instead of turning the glass through an angle of 90°.

Although only illustrative forms of the invention have been shown and described in detail it will be apparent to those skilled in the art that the invention is not so limited but that various changes can be made therein without departing from the spirit or the scope of the invention as exemplified in the appended claims.

I claim:

1. A fractional cutting attachment for a glass cutting table having regularly spaced rule gauging projections thereon disposed in rows adjacent opposite edges of said table, comprising a member having a series of openings therein spaced in a row according to the spacing of said projections for receiving a plurality of said projections therein, said member having a guide therein parallel to said row of openings, a slide adjustable in said guide and having a projection thereon adapted to gauge the position of a glass cutting rule, and means for positively securing the slide at various positions along the guide.

2. A fractional cutting attachment for a glass cutting table having regularly spaced rule-gauging pins thereon disposed in rows adjacent opposite edges of said table, comprising a bar having therein a groove of dovetail configuration in cross section, said groove extending longitudinally of the bar, a wall portion of the bar adjacent the groove being resilient and springable to vary the width of the groove, rule-gauging projections having dovetail base portions slidable in said groove, and groove constricting means engageable with opposite wall portions of the bar to draw the walls of said groove in locking relation upon opposite sides of said base portions, said bar having pin receiving openings extending therethrough transversely of the groove in spaced relation corresponding to the spacing of the rule-gauging pins on the table and the latter pins being engageable in said pin receiving openings to secure the bar on the table.

3. A fractional cutting attachment for a glass cutting table having regularly spaced rule-gauging pins thereon disposed in rows adjacent opposite edges of said table, comprising a bar having therein a groove of dovetail configuration in cross section, said groove extending longitudinally of the bar, a wall portion of the bar adjacent the groove being slit to define a resilient neck springable to vary the width of the groove, rule-gauging projections having dovetail base portions slidable in said groove, a bolt loosely traversing a wall portion of the bar from one side of the slit portion and being screwthreaded into the wall portion of the other side of the slit portion to draw the walls of said groove in locking relation upon opposite sides of said base portions, said bar having pin receiving openings extending therein transversely of the groove in spaced relation corresponding to the spacing of the rule-gauging pins on the table and the latter pins being engageable in said pin receiving openings to secure the bar to the table.

4. A fractional cutting attachment for a glass cutting table having regularly spaced rule-gauging pins thereon disposed in rows adjacent opposite edges of said table, comprising a bar having a groove extending longitudinally thereof, a wall portion of the bar adjacent the groove being resilient and springable to vary the width of the groove, rule-gauging projections having base portions slidable in said groove, groove constricting means engageable with opposite wall portions of the bar to draw the walls of said groove in locking relation upon opposite sides of said base portions, said bar having pin receiving openings extending therein transversely of the groove in spaced relation corresponding to the spacing of the rule-gauging pins on the table and the latter pins being engageable in said pin receiving openings to secure the bar to the table.

5. A fractional cutting attachment for a glass cutting table having regularly spaced rule-gauging pins thereon disposed in rows adjacent opposite edges of said table, comprising a bar having therein a groove extending longitudinally of the bar, a wall portion of the bar adjacent the groove being slit to define a resilient neck springable to vary the width of the groove, rule-gauging projections having base portions slidable in said groove, a bolt loosely traversing a wall portion of the bar from one side of the slit portion and being screwthreaded into the wall portion of the other side of the slit portion to draw the walls of said groove in locking relation upon opposite sides of said base portions, said bar having pin receiving openings extending therein transversely of the groove in spaced relation corresponding to the spacing of the rule-gauging pins on the table and the latter pins being engageable in said pin receiving openings to secure the bar to the table.

6. For use with a standard glass cutting table having spaced pins at opposite edges thereof and a standard cutting rule having a tip at its far end and a hook near its handle end, a variable fraction plug device comprising a pair of plugs including a tip plug and a hook plug, said plugs adapted to engage the tip and hook respectively of the cutting rule, said plugs each having slide blocks constructed and arranged to receive the tip and hook respectively of the rule and slidably mounted in their respective plugs, a fraction scale and index between the plugs and their respective slide blocks for indicating fractional positions of the slide blocks between the pins, and means for holding the slide blocks in adjusted position.

7. For use with a standard glass cutting table having spaced pins at opposite edges thereof and a standard cutting rule having a tip at its far end and a hook near its handle end, a variable fraction plug device comprising a pair of plugs including a tip plug and a hook plug, said plugs adapted to engage the tip and hook respectively of the cutting rule, said plugs each having slide blocks constructed and arranged to receive the tip and hook respectively of the rule and slidably mounted in their respective plugs, a fraction scale and index between the plugs and their respective slide blocks for indicating fractional positions of the slide blocks between the pins, and means for holding the slide blocks in adjusted position, said plugs having holes directed transversely thereof to receive therein a plurality of said spaced pins of the cutting table, at least one of said plugs having means to bind it upon said table.

8. For use with a standard glass cutting table having spaced pins at opposite edges thereof and a standard cutting rule having a tip at its far end and a hook near its handle end, a variable fraction plug device comprising a pair of plugs including a tip plug and a hook plug, said plug adapted to engage the tip and hook respectively of the cutting rule, said plugs each having slide blocks constructed and arranged to receive the tip and hook respectively of the rule and slidably mounted in their respective plugs, a fraction scale and index between the plugs and their respective slide blocks for indicating fractional positions of the slide blocks between the pins, and means for holding the slide blocks in adjusted position, said plugs having holes directed transversely thereof to receive therein a plurality of said spaced pins of the cutting table, at least one of the plugs having means in bindable engagement with one of said pins to secure said one of the plugs upon the table.

9. For use with a standard glass cutting table having spaced pins at opposite edges thereof and a standard cutting rule having a tip at its far end and a hook near its handle end, a variable fraction plug device comprising a pair of plugs including a tip plug and a hook plug, said plugs adapted to engage the tip and hook respectively of the cutting rule, said plugs each having slide blocks constructed and arranged to receive the tip and hook respectively of the rule and slidably mounted in their respective plugs, a fraction scale and index between the plugs and their respective slide blocks for indicating fractional positions of the slide blocks between the pins, and means for holding the slide blocks in adjusted position, said plugs having holes directed transversely thereof to receive therein a plurality of said spaced pins of the cutting table, at least one of the plugs having a set screw threaded therein in bindable engagement with one of said pins to secure said one of the plugs upon the table.

10. For use with a standard glass cutting table having spaced pins arranged in rows at opposite edges of the table and in cooperable relationship with a cutting rule having a tip at its far end and a hook near its handle end; bars disposed on opposite edge portions of the table and having longitudinal grooves formed therein, said bars having resilient wall portions between opposite wall portions of the grooves of the respective bars, rule engaging tip projections and hook projections carried by the bars at opposite edge portions of the table and engageable with the tip and hook respectively of the cutting rule to gauge the position of the rule across the table, said tip projection and hook projection having base portions adjustable longitudinally in the grooves to distribute the projections at desired spaced positions along the bars, groove constricting means on each bar operable to draw the walls of the groove in locking relation upon the base portions therein, each bar having pin receiving openings extending therein transversely of the groove in spaced relation corresponding to the spacing of the rule gauging pins on the table and the latter pins being engageable in said pin receiving openings to position the bars on the table.

11. For use with a standard glass cutting table having spaced pins arranged in rows at opposite edges of the table and in cooperable relation with a cutting rule having a tip at its far end and a hook near its handle end; adapter bars disposed on opposite edge portions of the table, each bar having a groove extending longitudinally therein and having a slit intersecting the groove and extending toward but short of the outer side of the bar thereby defining a resilient neck in the bar opposite the groove opening, rule gauging tip projections and hook projections carried by the bars at opposite edge portions of the table and engageable with the tip and hook respectively of the cutting rule in gauging the position of the rule across the table, said tip projection and hook projection having base portions slidably adjustable in the grooves longitudinally of the latter to distribute the projections at desired positions along the bars, groove constricting means on each bar operable to draw the walls of the groove in locked relation upon the base portion of the projection against the resiliency of the neck portion, each bar having pin receiving openings extending therein transversely of the groove in spaced relation corresponding to the spacing of the rule gauging pins on the table and the latter pins being engageable in said pin receiving openings to position the bar on the table.

12. For use with a standard glass cutting table having spaced pins arranged in rows at opposite edges of the table and in cooperable relation with a cutting rule having a tip at its far end and a hook near its handle end; parallel adapter bars mounted along opposite marginal portions of the cutting table, each bar including a groove running longitudinally of the bar, rule gauging tip pins and hook pins in bars at opposite edge portions of the table and engageable with the tip and hook respectively of the cutting rule, said tip and hook pins having base portions slidable longitudinally in said grooves for adjustment therein, each bar having a slit at the bottom of the groove opposite the mouth of said groove and extending toward the side of the bar opposite the groove and defining a resilient bar area permitting the sides defining the groove to be closed upon the base of the rule gauging pin, and fastening means extending slidably through each bar on one side of the slit and screw threaded into the bar on the other side of the slit in intersecting relation to said slit and outside the area of the groove.

THOMAS McDOWELL.

REFERENCES CITED

The following references are of record in the file of this patent:

UNITED STATES PATENTS

| Number | Name | Date |
| --- | --- | --- |
| 368,928 | Buck | Aug. 30, 1887 |
| 1,532,910 | McCann | Apr. 7, 1925 |
| 1,663,248 | Fritsch | Mar. 20, 1928 |
| 1,834,143 | Collard et al. | Dec. 1, 1931 |
| 1,946,356 | Owen | Feb. 6, 1934 |
| 1,996,386 | Owen | Apr. 2, 1935 |
| 2,104,301 | Haughey | Jan. 4, 1938 |
| 2,445,533 | Mondron et al. | July 20, 1948 |

FOREIGN PATENTS

| Number | Country | Date |
| --- | --- | --- |
| 137,501 | Great Britain | Jan. 15, 1920 |